United States Patent
Saito

(10) Patent No.: US 10,412,944 B2
(45) Date of Patent: Sep. 17, 2019

(54) PINION GEAR FOR A FISHING REEL

(71) Applicant: Shimano Inc., Sakai, Osaka (JP)

(72) Inventor: Kei Saito, Osaka (JP)

(73) Assignee: Shimano Inc., Osaka (JP)

( * ) Notice: Subject to any disclaimer, the term of this patent is extended or adjusted under 35 U.S.C. 154(b) by 50 days.

(21) Appl. No.: 15/842,761

(22) Filed: Dec. 14, 2017

(65) Prior Publication Data

US 2018/0255756 A1    Sep. 13, 2018

(30) Foreign Application Priority Data

Mar. 13, 2017  (JP) ................................ 2017-047238

(51) Int. Cl.
| | | |
|---|---|---|
| *A01K 89/01* | (2006.01) | |
| *A01K 89/015* | (2006.01) | |
| *F16H 55/17* | (2006.01) | |
| *F16H 57/00* | (2012.01) | |
| *F16H 55/18* | (2006.01) | |

(52) U.S. Cl.
CPC ......... *A01K 89/0183* (2015.05); *F16H 55/17* (2013.01); *F16H 55/18* (2013.01); *F16H 57/0025* (2013.01)

(58) Field of Classification Search
CPC ..................... A01K 89/0183; A01K 89/01902
See application file for complete search history.

(56) References Cited

U.S. PATENT DOCUMENTS

| | | | | |
|---|---|---|---|---|
| 5,271,287 A * | 12/1993 | Wadleigh | ............... | B23K 20/12 474/152 |
| 6,216,969 B1 * | 4/2001 | Yamaguchi | ........ | A01K 89/0155 242/260 |
| 2002/0043124 A1 * | 4/2002 | Shiga | ..................... | B29C 45/16 74/434 |
| 2010/0101350 A1 * | 4/2010 | Hawighorst | ............ | F16H 55/06 74/434 |
| 2011/0247581 A1 * | 10/2011 | Trieschmann | .......... | C22C 37/04 123/192.2 |
| 2011/0250070 A1 * | 10/2011 | Demtroder | ............ | B23P 11/025 416/170 R |
| 2012/0297911 A1 * | 11/2012 | Geiman | ................... | B21K 1/30 74/434 |

(Continued)

FOREIGN PATENT DOCUMENTS

| | | |
|---|---|---|
| JP | 2013-169171 A | 9/2013 |
| JP | 2013-169201 A | 9/2013 |
| JP | 2014-197986 A | 10/2014 |

*Primary Examiner* — Emmanuel M Marcelo
(74) *Attorney, Agent, or Firm* — Global IP Counselors, LLP

(57) ABSTRACT

A pinion gear meshes with a drive gear. The drive gear is connected to a handle shaft of a fishing reel that winds a fishing line onto a spool supported by a reel body by rotational operation of the handle shaft rotatably supported to the reel body to transmit the rotation of the handle shaft. The pinion gear includes a gear portion and a shaft. The gear portion meshes with the drive gear. The shaft portion, to which the gear portion is non-rotatably fitted, is integrally rotatable with the gear portion. The gear portion and the shaft portion are formed from different materials, and the specific gravity of the shaft portion is smaller than the specific gravity of the gear portion.

9 Claims, 5 Drawing Sheets

(56) References Cited

U.S. PATENT DOCUMENTS

| | | | | |
|---|---|---|---|---|
| 2013/0160589 A1* | 6/2013 | Mittermair | .............. | F16H 55/06 |
| | | | | 74/409 |
| 2013/0200194 A1* | 8/2013 | Lawson | ................. | A01K 89/05 |
| | | | | 242/268 |
| 2013/0220050 A1* | 8/2013 | Koike | ................... | A01K 89/00 |
| | | | | 74/439 |
| 2014/0083222 A1* | 3/2014 | Cleeves | ................... | F16H 1/06 |
| | | | | 74/421 R |
| 2014/0238171 A1* | 8/2014 | Kastrup | .............. | F16H 57/0025 |
| | | | | 74/434 |
| 2014/0298940 A1* | 10/2014 | Lin | ......................... | B21K 1/30 |
| | | | | 74/434 |
| 2014/0364277 A1* | 12/2014 | Takagi | ................ | F16H 57/0025 |
| | | | | 477/108 |
| 2017/0261087 A1* | 9/2017 | White | ..................... | B23K 9/04 |
| 2017/0314664 A1* | 11/2017 | Hesse | ................ | F16H 55/0806 |

* cited by examiner

PINION GEAR FOR A FISHING REEL

CROSS-REFERENCE TO RELATED APPLICATIONS

This application claims priority to Japanese Patent Application No. 2017-047238, filed on Mar. 13, 2017. The entire disclosure of Japanese Patent Application No. 2017-047238 is hereby incorporated herein by reference.

BACKGROUND

Field of the Invention

The present invention relates to a pinion gear for a fishing reel.

Background Art

Parts of a fishing reel are required to be lightweight while maintaining strength. For example, in Japanese Laid-Open Patent Publication No. 2014-197986, a drive gear of a drive shaft to which a handle of a fishing reel is connected comprises an inner side member and an outer side member. The inner side member comprises a surface treatment film. The outer side member comprises gear teeth that are fixed on the outer perimeter side of the inner side member and machined after being fixed to the inner side member.

In the drive gear that is incorporated in the fishing reel of Japanese Laid-Open Patent Publication No. 2013-169201, the outer perimeter portion including the tooth surface, and the main body portion on the radially inner side thereof, are integrally formed from different materials. The drive gear is integrally formed from different materials such that, if the material strength, material density (specific gravity), and vibration-damping ability of the materials forming the outer perimeter portion and the main body portion are respectively defined as (S1, S2), (P1, P2), and (F1, F2), the following inequalities are satisfied: S1>S2, P1>P2, F1<F2.

In Japanese Laid-Open Patent Publication No. 2013-169201, the drive gear of the dual-bearing reel is formed such that the outer perimeter portion including the tooth surface is high strength and high density (high specific gravity) with respect to the main body portion, in order to achieve a light weight with respect to the strength. Furthermore, by selecting a material on the main body portion side that has a higher vibration-damping ability than the outer perimeter portion, vibrations that occur on the tooth surface when rotated in a state of being engaged with a pinion gear can be dampened; therefore, even if fine vibrations or rattling sounds occur due to the meshing relationship with the pinion gear, the vibrations and sounds can be effectively absorbed by the main body portion, which is formed of a material with a high vibration-damping ability.

In the dual-bearing reel of Japanese Laid-Open Patent Publication No. 2013-169171, a drive gear mounted on a handle shaft is formed such that the outer perimeter portion including the tooth surface and the main body portion adjacent to a lining material are integrally formed. In this configuration, the outer perimeter portion and the main body portion are formed of different materials; the outer perimeter portion is formed of a higher strength material than the main body portion, and the main body portion, a drag washer, and a handle shaft are formed of an aluminum-based metal.

All the devices disclosed in these references relate to a drive shaft connected to a handle of a fishing reel. In particular, Japanese Laid-Open Patent Publication No. 2013-169201 discloses that, by employment in a drive gear of a dual-bearing reel, when rotated and engaged with a pinion gear, it is possible to dampen the vibration that occurs on the tooth surface, and together with the point that the moment of inertia is high due to the difference in the specific gravity, a smooth, damp rotation feeling can be obtained by the hand that holds the handle.

Meanwhile, conventional fishing reels have parts that rotate other than the drive shaft connected to the handle. In particular, since a pinion gear that meshes with the drive shaft generally rotates faster than the drive shaft, the pinion gear is required to be lightened in order to lighten the rotation operation of the handle. However, since a pinion gear is formed from one type of material, there is a limit to reducing the weight thereof while maintaining the strength of the gear.

SUMMARY

The present invention was made to solve the problems described above, and an object thereof is to reduce the weight of a pinion gear that meshes with a drive gear of a fishing reel.

The pinion gear according to a first aspect of the present invention is a pinion gear that meshes with a drive gear connected to a handle shaft of a fishing reel that winds a fishing line onto a spool supported by a reel body by rotational operation of the handle shaft rotatably supported by the reel body to transmit the rotation of the handle shaft, the pinion gear comprising a gear portion that meshes with the drive gear, and a shaft portion, to which the gear portion is non-rotatably fixed and that is integrally rotated with the gear portion, the gear portion and the shaft portion being formed from different materials, and the specific gravity of the shaft portion being lower than the specific gravity of the gear portion.

Preferably, the gear portion and the shaft portion are fixed to each other by an adhesive.

More preferably, a hole that extends through in the rotational axis direction of the pinion gear and to which the shaft portion is fitted is formed in the gear portion, the inner perimeter surface of the gear portion in which the shaft portion is inserted includes a tapered inner perimeter surface, in which the inner diameter at one end in the rotational axis direction is greater than the inner diameter at the other end, the outer perimeter surface of at least a portion of the area to which the gear portion of the shaft portion is fitted is a tapered outer perimeter surface, in which the outer diameter at one end in the rotational axis direction is greater than the outer diameter at the other end, and the adhesive is interposed between the tapered inner perimeter surface and the tapered outer perimeter surface.

More preferably, a cylindrical inner side surface that is parallel to the rotational axis of the pinion gear is formed on the inner perimeter surface on the large-diameter side of the tapered inner perimeter surface of the gear portion, an abutting surface with which the gear portion abuts in the rotational axis direction, and a cylindrical outer side surface that is parallel to the rotational axis are formed on the outer perimeter surface on the large-diameter side of the tapered outer perimeter surface of the shaft portion, and the cylindrical inner side surface of the gear portion is fitted to the cylindrical outer side surface of the shaft portion.

More preferably, the length of the cylindrical inner side surface in the rotational axis direction is greater than the length of the cylindrical outer side surface in the rotational axis direction, and the outer diameter of the cylindrical outer side surface of the shaft portion is greater than the maximum inner diameter of the tapered inner perimeter surface of the shaft portion.

Preferably, the gear portion is formed of brass and the shaft portion is formed of aluminum alloy.

Alternatively, the gear portion may be formed of metal and the shaft portion may be formed of synthetic resin.

Preferably, the fishing reel is a spinning reel comprising a rotor that winds a fishing line onto a spool by a rotation operation of the handle shaft, and the pinion gear transmits the rotation of the handle shaft to the rotor.

In a second aspect of the invention, a spinning reel is disclosed. The spinning reel according to the second aspect of the present invention comprises a reel body, a handle shaft that is rotatably supported by the reel body, a spool supported by the reel body and onto which a fishing line is wound by rotational operation of the handle shaft, a rotor that winds the fishing line onto the spool, and the pinion gear according to the first aspect, wherein the pinion gear transmits the rotation of the handle shaft to the rotor.

According to the present invention, since the shaft portion and the gear portion configuring the pinion gear are made of different materials, and the specific gravity of the shaft portion is lower than the specific gravity of the gear portion, it is possible to reduce the weight of the pinion gear.

BRIEF DESCRIPTION OF THE DRAWINGS

Referring now to the attached drawings which form a part of this original disclosure.

DETAILED DESCRIPTION OF THE EMBODIMENTS

First Embodiment

Figure 1:
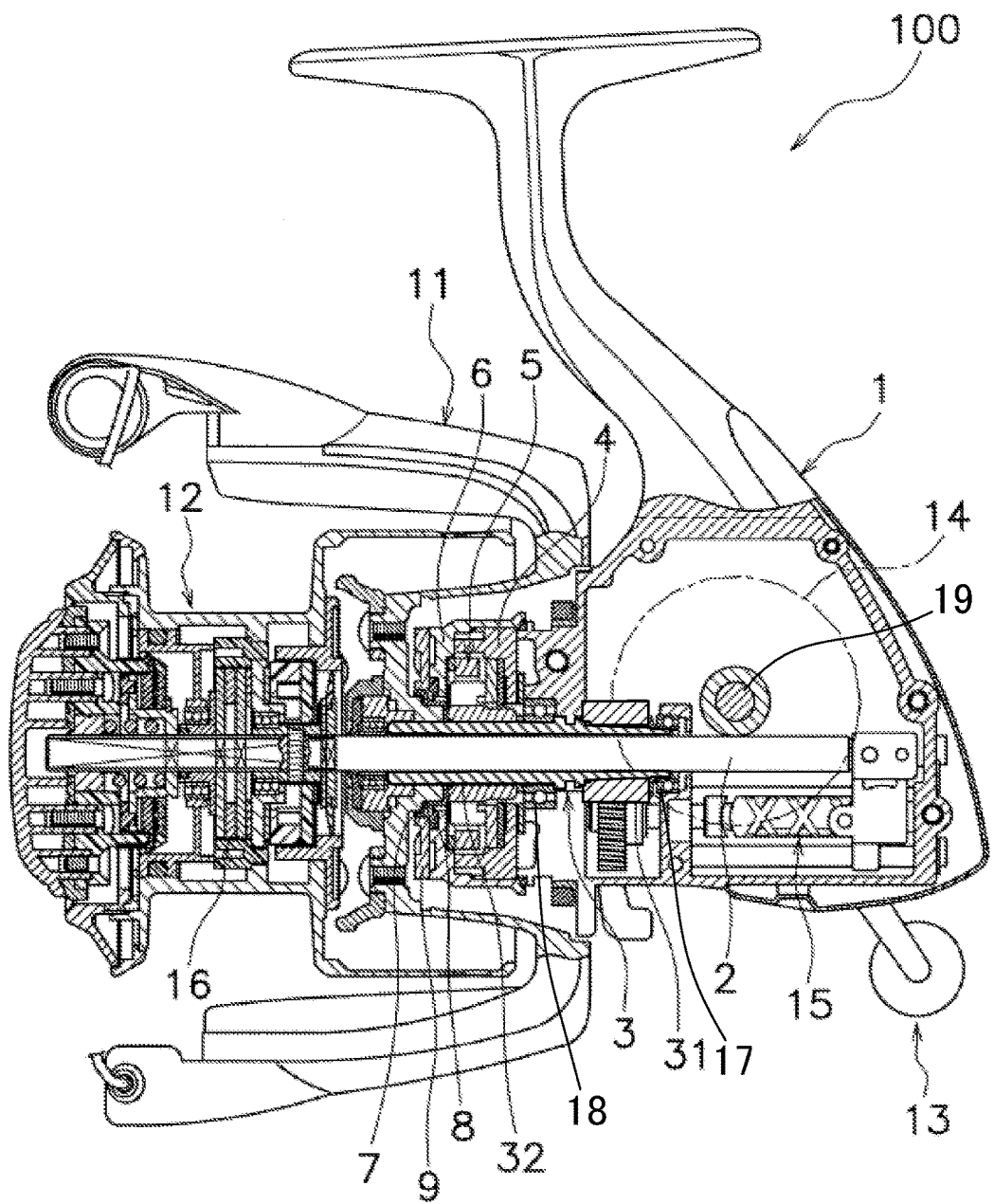
FIG. 1 is a cross-sectional view of a spinning reel according to a first embodiment of the present invention.

FIG. 1 is a cross-sectional view of a spinning reel according to an embodiment of the present invention. In the embodiment, a pinion gear 3 of a spinning reel 100, which is a fishing reel, is the subject. The spinning reel 100 is attached to a fishing rod so that the left direction in FIG. 1 is oriented toward the distal end (front) of the fishing rod. The spinning reel 100 comprises a reel body 1, a rotor 11, a spool 12, and a handle 13. The handle 13 is attached to a handle shaft 19 that is rotatably supported by the reel body 1. A fishing line (not shown) that is wound to the spool 12 is unspooled (cast) in a forward direction, that is, in the left direction in FIG. 1.

The rotor 11 is rotated around the central axis that extends in the forward/rearward direction, that is, the left-right direction in FIG. 1, by turning the handle 13, which is a crank, around the handle shaft 19. When the handle 13 is turned, the spool 12 is reciprocated in the forward/rearward direction, in synchronization with the rotation of the rotor 11. By the rotation of the rotor 11 and the reciprocating motion of the spool 12, the unspooled fishing line is guided by the rotor 11 and evenly wound on the cylindrical surface of the spool 12.

The rotor 11 is fixed to the pinion gear 3 by fitting to a shaft 32 of the pinion gear 3, and is rotated together with the pinion gear 3. The pinion gear 3 is rotatably supported by the reel body 1 by two axle bearings 17, 18. The pinion gear 3 has a hollow tubular shape, and a spool shaft 2 is disposed extending through the pinion gear 3. The spool shaft 2 and the pinion gear 3 are relatively rotated and reciprocated. A spool 12 is mounted to the front end side of the spool shaft 2 via a drag mechanism 16. The rear end side of the spool shaft 2 is connected to an oscillating mechanism 15.

The handle 13 is a crank, and a drive gear 14 is attached to the handle shaft 19, which is a crankshaft. The drive gear 14 is, for example, a face gear, and is meshed with a gear portion 31 of the pinion gear 3. The gear portion 31 is, for example, a helical gear, and is fitted to the shaft portion 32 to be integrally rotated as a pinion gear 3. The pinion gear 3 is rotated in accordance with a rotation operation of the handle 13. The oscillating mechanism 15 is rotated in synchronization with the pinion gear 3. When the oscillating mechanism 15 is rotated, the spool shaft 2 is reciprocated in the forward/rearward direction. The rear end side of the spool shaft 2, the gear portion 31 side of the pinion gear 3, the drive gear 14, and the oscillating mechanism 15 are housed in the reel body 1. The pinion gear 3 transmits the rotation of the handle shaft 19 to the rotor 11 and the oscillating mechanism 15.

A one-way clutch 5 is disposed between the pinion gear 3 and the housing member 4 so that the pinion gear 3 can be rotated only in one direction. The housing member 4 is fixed to the reel body 1. The one-way clutch 5 is maintained in the housing member 4 by a lid member 6. The lid member 6 covers the front surface of the housing member 4 excluding the rotating portion that rotates together with the pinion gear 3. The lid member 6 is fixed so as to not contact the rotating portion.

The gap between the lid member 6 and the pinion gear 3 is sealed by a tubular member 7, a seal member 8, and a holding member 9. The tubular member 7 is non-rotatably fitted to the pinion gear 3 in front of the one-way clutch 5, and is integrally rotated with the pinion gear 3. The seal member 8 is formed in an annular shape from a material that has elasticity, and the inner perimeter surface thereof opposes the outer perimeter surface of the tubular member 7. The annular holding member 9 is fixed to the lid member 6 so as to not contact the portion that rotates together with the pinion gear 3, and prevents the seal member 8 from falling out forward.

Figure 2:
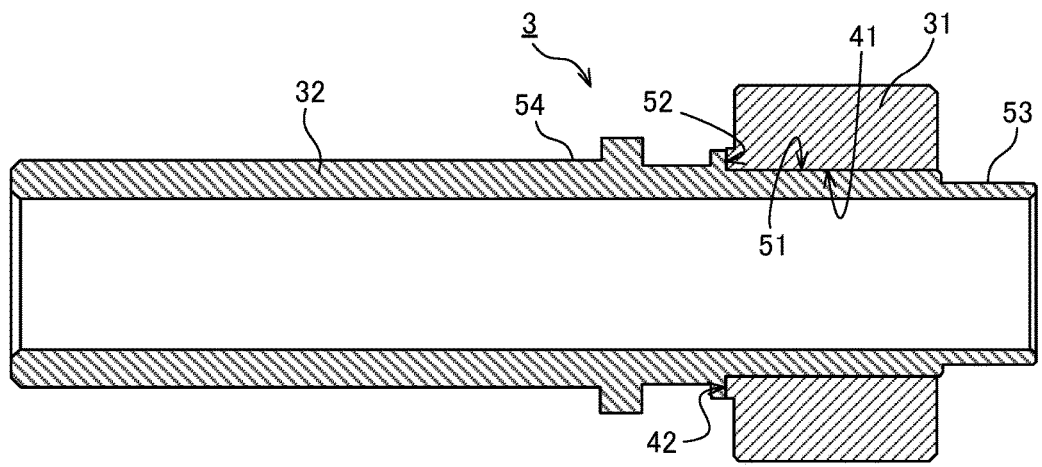
FIG. 2 is a cross-sectional view of a pinion gear according to the first embodiment.

FIG. 2 is a cross-sectional view of a pinion gear according to the first embodiment. The pinion gear 3 is formed of a tubular shaft 32, and a gear portion 31 that is non-rotatably fitted to the shaft portion 32. At the portion where the gear portion 31 and the shaft portion 32 are fitted, a cylindrical surface 41 is formed in the gear portion 31 and a cylindrical surface 51 is formed on the shaft portion 32. The fitting between the cylindrical surface 41 and the cylindrical surface 51 is an interference fit.

An abutting surface 42 is formed on the end surface of the gear portion 31. An abutting surface 52 is formed at the end portion of the shaft portion 32 to which the gear portion 31 is fitted. The abutting surface 42 of the gear portion 31 abuts the abutting surface 52 of the shaft portion 32 in the rotational axis direction, such that the axial position of the gear portion 31 with respect to the shaft portion 32 is determined. The gear portion 31 and the shaft portion 32 do not abut in the rotational axis direction except for the abutting surface 42 and the abutting surface 52. It is also possible to exclude the abutting surface 52, and to position the gear portion 31 in the axial direction with respect to the shaft portion 32 by using a jig that maintains a gap between the end surface of the gear portion 31 and the end surface of the shaft portion 32 at a prescribed distance.

Supporting surfaces 53 and 54 to which axle bearings 17 and 18 are respectively fitted are formed on the shaft portion 32. In the first embodiment, the axle bearings 17, 18, which rotatably support the pinion gear 3, are fitted to the shaft portion 32 of the pinion gear 3. In the first embodiment, it is preferable to match the center of the cross-section of the supporting surfaces 53, 54 of the shaft portion 32 and the center of the pitch circle of the gear portion 31.

The gear portion 31 is formed of, for example, brass, and the shaft portion 32 is formed of, for example, aluminum alloy. The specific gravity of aluminum alloy is lower than the specific gravity of brass. Furthermore, for example, the gear portion 31 may be formed of stainless steel, and the shaft portion 32 may be formed of aluminum alloy. Alternatively, as a combination of materials, the gear portion 31 may be formed of aluminum alloy, and the shaft portion 32 may be formed of magnesium alloy. In all embodiments, the specific gravity of the shaft portion 32 is preferably lower than the specific gravity of the gear portion 31.

If the use of the spinning reel 100 is limited to fishing for small fish, and the tensile force of the fishing line is low, for example, the gear portion 31 may be formed of aluminum alloy, and the shaft portion 32 may be formed of synthetic resin. For example, epoxy resin, polyamide resin, or phenol resin, reinforced by glass fiber or carbon fiber, can be used for the shaft portion 32. In this embodiment, the gear portion 31 may be formed of brass. In all embodiments, the specific gravity of the shaft portion 32 is preferably lower than the specific gravity of the gear portion 31.

Usually, to manufacture a pinion gear 3, gear teeth are formed on the gear portion 31, and then the gear portion 31 is fitted to the shaft portion 32. Prior to forming the gear teeth of the gear portion 31, a block can be fitted to the shaft portion 32 first, and then the block can be machined to form the gear teeth when fitted to the shaft portion 32. If gear teeth are formed in a fitted state, the difference between the center of the pitch circle of the gear portion 31 and the center of the shaft portion 32 can be reduced. More precisely, since it is possible to match the center of the pitch circle of the gear portion 31 and the center of the outer perimeters of the supporting surfaces 53, 54, to which are fitted the axle bearings 17, 18, which support the pinion gear 3, the eccentricity of the pitch circle of the gear portion 31 when the pinion gear 3 is rotated can be reduced.

Figure 3:
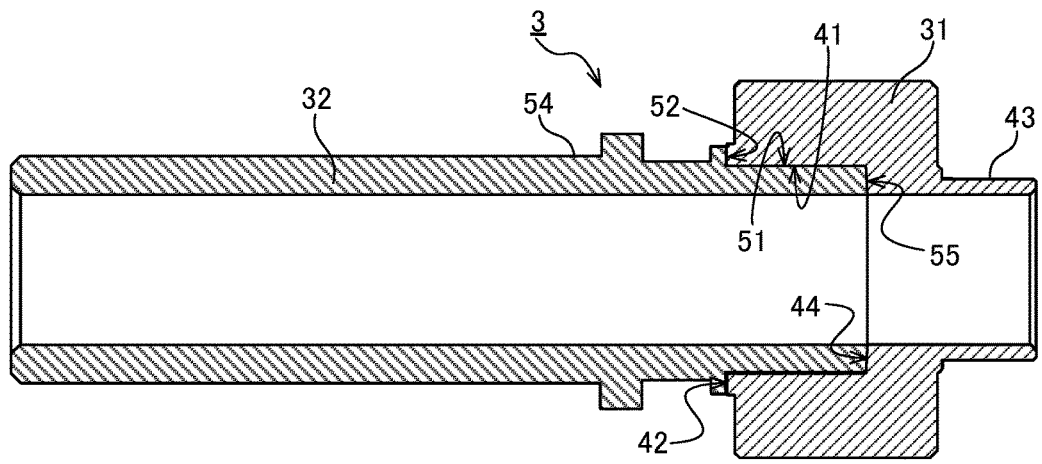
FIG. 3 is a cross-sectional view of a pinion gear according to a modified example of the first embodiment.

FIG. 3 is a cross-sectional view of a pinion gear according to a modified example of the first embodiment. In the modified example, the shaft portion 32 extends only halfway into the gear portion 31 in the rotational axis direction and does not extend through the gear portion 31. Then, a supporting surface 43 of the pinion gear 3 to which the axle bearing 17 is fitted is formed in the gear portion 31. As in the embodiment shown in FIG. 2, the gear portion 31 is non-rotatably fitted to the shaft portion 32 by an interference fit. The materials of the gear portion 31 and the shaft portion 32 are the same as the gear portion 31 and the shaft portion 32 of the first embodiment.

In this modified example, the stepped surface 44 of the inner perimeter surface of the gear portion 31 and the end surface 55 of the shaft portion 32 oppose each other. The stepped surface 44 and the end surface 55 may abut, instead of abutting the abutting surface 42 of the gear portion 31 and the abutting surface 52 of the shaft portion 32, so as to achieve positioning in the rotational axis direction. In that case, the stepped surface 44 and the end surface 55 become abutting surfaces, and thus abutting surfaces 42 and 52 do not need to be formed.

In this modified example, of the axle bearings 17, 18, which support the pinion gear 3, the supporting surface 43, to which the axle bearing 17 that is closer to the gear portion 31 is fitted, is formed on the gear portion 31; therefore, the concentricity between the center of the supporting surface 43 and the center of the pitch circle of the gear portion 31 can be increased.

Second Embodiment

Figure 4:
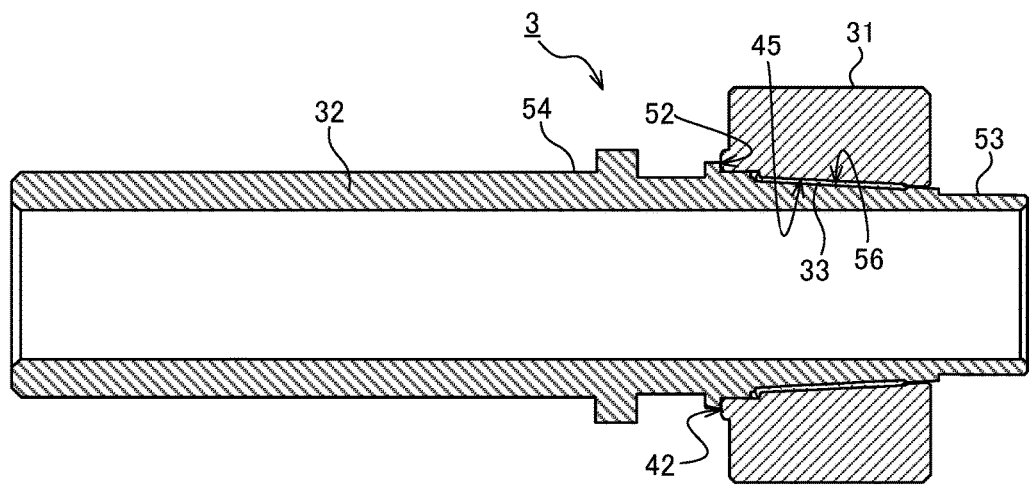
FIG. 4 is a cross-sectional view of a spinning reel according to a second embodiment of the present invention.

FIG. 4 is a cross-sectional view of a pinion gear according to a second embodiment of the present invention. In the second embodiment, the gear portion 31 and the shaft portion 32 are not fixed by an interference fit, but are fixed to each other by an adhesive. A gap is formed in at least a portion of the area where the gear portion 31 and the shaft portion 32 are fitted, and the gap is filled with an adhesive 33 to achieve the fixing. After the adhesive 33 is applied, the fitting portion is further tapered so that the shaft portion 32 can be easily inserted into the fitting hole of the gear portion 31.

As shown in FIG. 4, a tapered inner perimeter surface 45 is formed on the inner perimeter surface of the gear portion 31, wherein the inner diameter of the end farther from the end portion on the side where the shaft portion 32 is inserted is greater than the inner diameter of the other end. In the portion of the shaft portion 32 to which the gear portion 31 is fitted is formed a tapered outer perimeter surface 56, wherein the outer diameter of the end farther from the end portion on the side that is inserted into the fitting hole of the gear portion 31 is greater than the outer diameter of the other end.

In the same manner as the first embodiment, an abutting surface 42 is formed on the gear portion 31 and an abutting surface 52 is formed on the shaft portion 32. When the abutting surface 42 abuts the abutting surface 52, a gap is formed between the tapered inner perimeter surface 45 and the tapered outer perimeter surface 56. An adhesive 33 is interposed in the gap between the tapered inner perimeter surface 45 and the tapered outer perimeter surface 56, and the gear portion 31 and the shaft portion 32 are bonded and fixed to each other by the adhesive 33.

Figure 5:
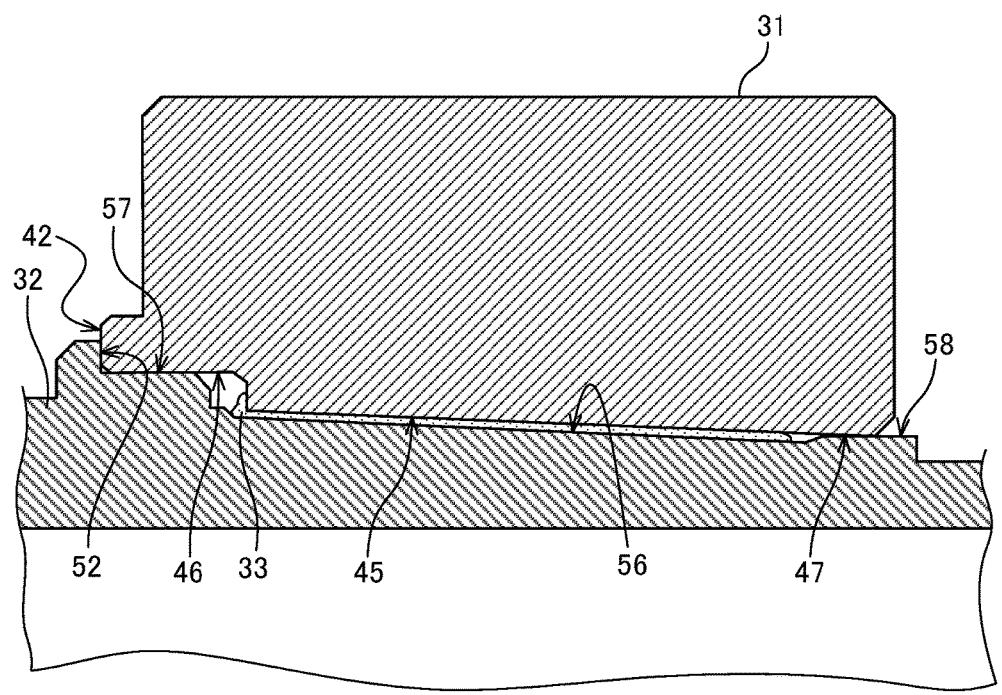
FIG. 5 is an enlarged cross-sectional view of the pinion gear according to the second embodiment.

FIG. 5 is an enlarged cross-sectional view of the pinion gear according to the second embodiment. A cylindrical inner side surface 46 that is parallel to the rotational axis is formed on the inner perimeter surface on the large-diameter side of the tapered inner perimeter surface 45 of the gear portion 31. A cylindrical outer side surface 57 that is parallel to the rotational axis is formed on the outer perimeter surface on the large-diameter side of the tapered outer perimeter surface 56 of the shaft portion 32. The cylindrical inner side surface 46 of the gear portion 31 is fitted to the cylindrical outer side surface 57 of the shaft portion 32. The fitting between the cylindrical inner side surface 46 and the cylindrical outer side surface 57 is an intermediate fit. The cylindrical inner side surface 46 of the gear portion 31 is fitted to the cylindrical outer side surface 57 of the shaft portion 32, and positioned in the radial direction.

The inner diameter of the cylindrical inner side surface 46 is greater than the maximum inner diameter of the tapered inner perimeter surface 45. Furthermore, the outer diameter of the cylindrical outer side surface 57 is greater than the maximum outer diameter of the tapered outer perimeter surface 56. The axial length of the cylindrical inner side surface 46 is longer than the axial length of the cylindrical outer side surface 57 such that the gear portion 31 and the shaft portion 32 do not abut in the rotational axis direction except for the abutting surface 42 and the abutting surface 52.

Alternatively, instead of including an abutting surface 52 on the shaft portion 32, a stepped portion between the cylindrical inner side surface 46 and the tapered inner perimeter surface 45 of the gear portion 31 can be brought into contact with a stepped portion between the cylindrical outer side surface 57 and the tapered outer perimeter surface 56 of the shaft portion 32, in order to position the gear portion 31 with respect to the shaft portion 32 in the rotational axis direction. In this embodiment, the outer diameter of the cylindrical outer side surface 57 is greater than the maximum inner diameter of the tapered inner perimeter surface 45. Furthermore, in this embodiment as well, a gap is formed between the tapered inner perimeter surface 45 and the tapered outer perimeter surface 56, when the stepped portions come into contact with each other.

A clearance-maintaining portion 58 having a greater diameter than the minimum outer diameter of the tapered outer perimeter surface 56 is formed on the small-diameter side of the tapered outer perimeter surface 56 of the shaft portion 32. A bracing portion 47 that is fitted to the clearance-maintaining portion 58 by an intermediate fit is formed on the small-diameter side of the tapered inner perimeter surface 45 of the gear portion 31. The bracing portion 47 may be an extended surface of the tapered inner perimeter surface 45. The bracing portion 47 and the clearance-maintaining portion 58 are preferably both cylindrical surfaces.

The inner diameter of the bracing portion 47 is equal to or less than the minimum inner diameter of the tapered inner perimeter surface 45. As long as the bracing portion 47 and the clearance-maintaining portion 58 are fitted and a clearance is maintained between the tapered inner perimeter surface 45 and the tapered outer perimeter surface 56, the outer diameter of the clearance-maintaining portion 58 may be the same as the minimum outer diameter of the tapered outer perimeter surface 56.

The materials of the gear portion 31 and the shaft portion 32 are the same as in the first embodiment. Examples of the combination of the gear portion 31 and the shaft portion 32 include brass and aluminum alloy, stainless steel and aluminum alloy, aluminum alloy and magnesium alloy, aluminum alloy and synthetic resin, and brass and synthetic resin. In all embodiments, the specific gravity of the shaft portion 32 is preferably lower than the specific gravity of the gear portion 31. An adhesive 33 that can withstand the shearing force that is generated by the torque that is applied by the gear portion 31 and the shaft portion 32 is selected in accordance with the materials of the gear portion 31 and the shaft portion 32.

In the pinion gear 3 of the second embodiment, since the gear portion 31 and the shaft portion 32 are fixed to each other by the adhesive 33, stress of the interference fit in the fitting of the gear portion 31 and the shaft portion 32 of the first embodiment does not occur. In the second embodiment as well, prior to forming gear teeth of the gear portion 31 a block can be fitted to the shaft portion 32 first, and then the block may be machined to form the gear teeth when fitted to the shaft portion 32.

In the second embodiment, since a tapered inner perimeter surface 45 and a tapered outer perimeter surface 56 are formed in the portion to be bonded, it is relatively easy to apply the adhesive 33 and to assemble. Furthermore, since positioning is carried out in the axial direction and the radial direction by the abutting surfaces 42, 52, the cylindrical inner side surface 46 and the cylindrical outer side surface 57, the axial position of the gear portion 31 with respect to the shaft portion 32 does not shift within the tolerance range of the tapered inner perimeter surface 45 and the tapered outer perimeter surface 56.

Third Embodiment

Figure 6:
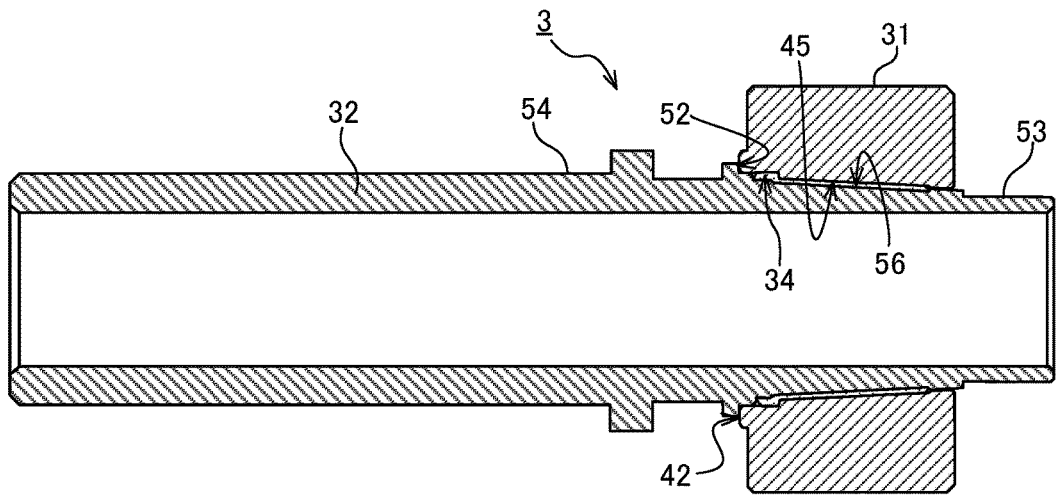
FIG. 6 is a cross-sectional view of a spinning reel according to the third embodiment of the present invention.

FIG. 6 is a cross-sectional view of a spinning reel according to the third embodiment of the present invention. In the third embodiment, an adhesive reservoir 34 is further disposed on the pinion gear 3 of the second embodiment. Other than the adhesive reservoir 34 being formed, the pinion gear 3 of the third embodiment is the same as the pinion gear 3 of the second embodiment.

Figure 7:
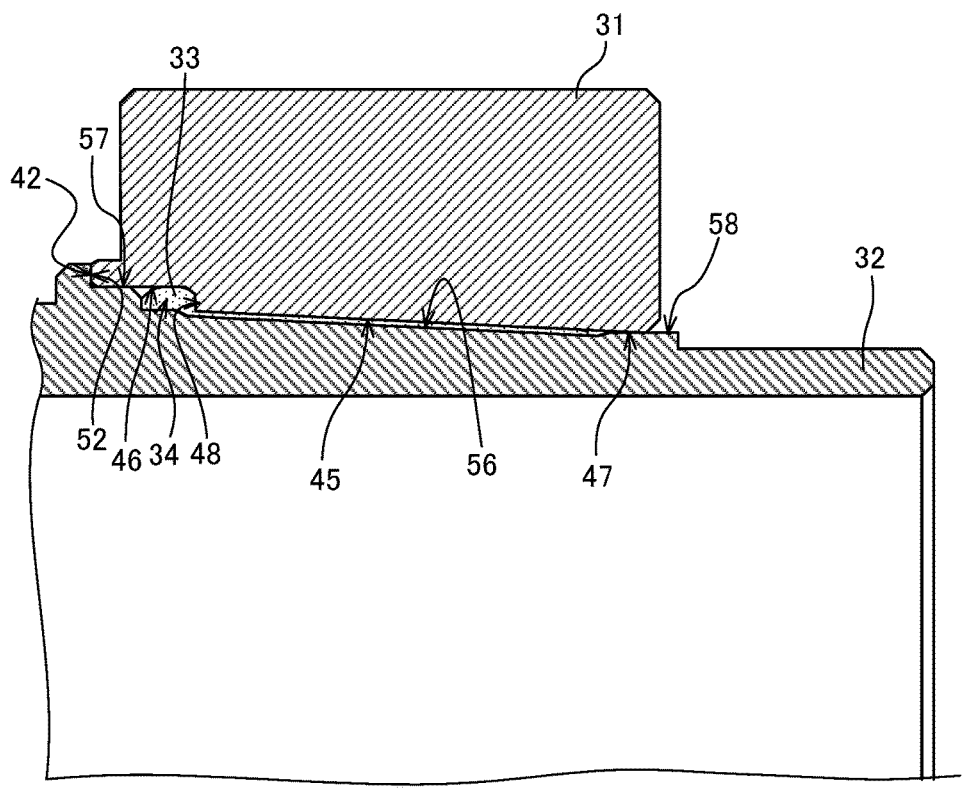
FIG. 7 is an enlarged cross-sectional view of the pinion gear according to the third embodiment.

FIG. 7 is an enlarged cross-sectional view of the pinion gear according to the third embodiment. The length of the cylindrical inner side surface 46 in the rotational axis direction is greater than the length of the cylindrical outer side surface 57 in the rotational axis direction. Furthermore, the outer diameter of the cylindrical outer side surface 57 is greater than the maximum inner diameter of the tapered inner perimeter surface 45. The adhesive reservoir 34 is the space between the outer perimeter surface of the shaft portion 32 to the cylindrical inner side surface 46 of the gear portion 31, formed between the maximum inner diameter of the tapered inner perimeter surface 45 of the gear portion 31 and the stepped portion 48 of the cylindrical inner side surface 46, and the cylindrical outer side surface 57 of the shaft portion 32, when the abutting surface 42 abuts the abutting surface 52. The volume of the adhesive reservoir 34 is greater than the difference between the maximum value of the volume of the gap that is formed by the maximum tolerance of the tapered inner perimeter surface 45 and the minimum tolerance of the tapered outer perimeter surface 56, and the minimum value of the volume of the gap that is formed by the minimum tolerance of the tapered inner perimeter surface 45 and the maximum tolerance of the tapered outer perimeter surface 56.

An adhesive 33 of an amount of the maximum value of the volume of the gap formed by the maximum tolerance of the tapered inner perimeter surface 45 and the minimum tolerance of the tapered outer perimeter surface 56 is applied on the tapered outer perimeter surface 56 of the shaft portion 32, and the shaft portion 32 is inserted into the gear portion 31. Then, since the gap between the tapered inner perimeter surface 45 and the tapered outer perimeter surface 56 is equal to or less than the maximum value, the gap is filled with the adhesive 33, and the excess adhesive 33 is stored in the adhesive reservoir 34. Since the volume of the adhesive reservoir 34 is greater than the difference between the minimum value and the maximum value of the gap, the adhesive 33 will not protrude from the adhesive reservoir 34.

Figure 8:
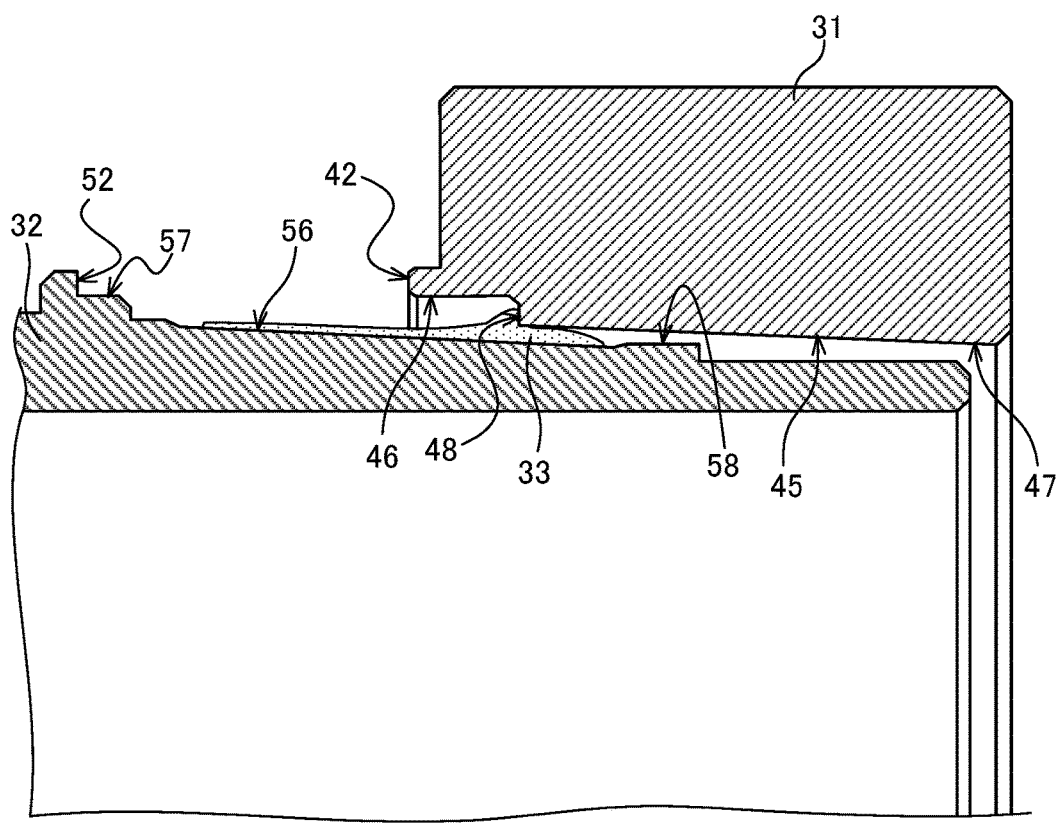
FIG. 8 is a partial cross-sectional view during assembly of the pinion gear according to the third embodiment.

FIG. 8 is a partial cross-sectional view during assembly of the pinion gear according to the third embodiment. When the above-described amount of adhesive 33 is applied on the tapered outer perimeter surface 56 of the shaft portion 32 and the shaft portion 32 is inserted into the gear portion 31, the excess adhesive 33 is scraped off by the stepped portion 48, and is pressed toward the maximum outer diameter of the tapered outer perimeter surface 56. Furthermore, when the gear portion 31 moves toward the abutting surface 52 of the shaft portion 32 and the abutting surface 42 abuts the abutting surface 52, as shown in FIG. 7, the excess adhesive 33 is stored in the adhesive reservoir 34.

Since an adhesive reservoir 34 is disposed in the pinion gear 3 of the third embodiment, the gap between the fitting surface of the gear portion 31 and the shaft portion 32 can be sufficiently filled with the adhesive 33, and the adhesive 33 will not protrude.

In the embodiments described above, a pinion gear 3 meshes with the drive gear of the spinning reel 100 and that rotates faster than the drive shaft. While the pinion gear 3 of the spinning reel 100 is hollow so that the spool shaft 2 can extend therethrough, by making the specific gravity of the shaft portion 32 lower than the specific gravity of the gear portion 31, the moment of inertia is small, and the responsiveness of the rotation operation of the handle 13 of the spinning reel 100 is improved.

A pinion gear may be formed from a shaft and a gear having different materials, such that the specific gravity of the shaft portion is lower than the specific gravity of the gear in the same manner as the embodiments regarding a pinion gear that meshes with the drive gear of a dual-bearing reel and that rotates faster than the drive shaft. Generally, a pinion gear of a dual-bearing reel is a hollow shaft, and rotates the spool by transmitting the rotation of the handle shaft thereto. Even in a dual-bearing reel, by making the specific gravity of the shaft portion of a pinion gear lower than the gear, it is possible to improve the responsiveness of the rotation operation of the handle by reducing the weight of the pinion gear while maintaining the strength of the gear.

What is claimed is:

1. A pinion gear configured to mesh with a drive gear, the drive gear connected to a handle shaft of a fishing reel for winding a fishing line onto a spool supported by a reel body by rotational operation of the handle shaft, the handle shaft rotatably supported by the reel body, and the drive gear configured to transmit the rotation of the handle shaft, the pinion gear comprising:
a gear portion configured to mesh with the drive gear; and
a shaft portion non-rotatably fixed to the gear portion, and integrally rotatable with the gear portion,
the gear portion and the shaft portion being formed from different materials, and a specific gravity of the shaft portion being lower than a specific gravity of the gear portion.

2. The pinion gear according to claim 1, wherein the gear portion and the shaft portion are fixed to each other by an adhesive.

3. The pinion gear according to claim 2, wherein
a hole is formed in the gear portion and extends therethrough in a rotational axis direction of the pinion gear and into which the shaft portion is fitted,
the hole in the gear portion includes a tapered inner perimeter surface, an inner diameter at a first end of the hole in the rotational axis direction being greater than an inner diameter at a second end,
an outer perimeter surface of at least a portion of an area to which the gear portion of the shaft portion is fitted is a tapered outer perimeter surface, an outer diameter of the tapered outer perimeter surface at a first end in the rotational axis direction is greater than an outer diameter of the tapered outer perimeter surface at a second end, and
the adhesive is interposed between the tapered inner perimeter surface and the tapered outer perimeter surface.

4. The pinion gear according to claim 3, wherein
the inner perimeter surface includes a cylindrical inner side surface parallel to the rotational axis of the pinion gear at the first end of the tapered inner perimeter surface of the gear portion,
an abutting surface with which the gear portion abuts in the rotational axis direction, and a cylindrical outer side surface parallel to the rotational axis, are formed on the outer perimeter surface on the first end of the tapered outer perimeter surface of the shaft portion, and
the cylindrical inner side surface of the gear portion is fitted to the cylindrical outer side surface of the shaft portion.

5. The pinion gear according to claim 4, wherein
a length of the cylindrical inner side surface in the rotational axis direction is greater than a length of the cylindrical outer side surface in the rotational axis direction, and
an outer diameter of the cylindrical outer side surface of the shaft portion is greater than a maximum inner diameter of the tapered inner perimeter surface of the shaft portion.

6. The pinion gear according to claim 1, wherein
the gear portion is formed from brass, and
the shaft portion is formed from aluminum alloy.

7. The pinion gear according to claim 1 wherein
the gear portion is formed from metal, and
the shaft portion is formed from synthetic resin.

8. The pinion gear according to claim 1, wherein
the fishing reel is a spinning reel comprising a rotor configured to wind the fishing line onto the spool by rotational operation of the handle shaft, and
the pinion gear is configured to transmit rotation of the handle shaft to the rotor.

9. A spinning reel, comprising:
a reel body;
a handle shaft rotatably supported by the reel body;
a spool supported by the reel body and onto which a fishing line is configured to be wound by a rotational operation of the handle shaft;
a rotor configured to wind the fishing line onto the spool by the rotational operation of the handle shaft; and
the pinion gear according to claim 1,
the pinion gear configured to transmit the rotation of the handle shaft to the rotor.

* * * * *